United States Patent
Kim

(10) Patent No.: US 8,586,171 B2
(45) Date of Patent: Nov. 19, 2013

(54) DISPLAY PANEL

(75) Inventor: Yong Beom Kim, Johns Creek, GA (US)

(73) Assignee: Yong Beom Kim, Johns Creek, GA (US)

( * ) Notice: Subject to any disclaimer, the term of this patent is extended or adjusted under 35 U.S.C. 154(b) by 377 days.

(21) Appl. No.: 13/035,965

(22) Filed: Feb. 26, 2011

(65) Prior Publication Data

US 2011/0217524 A1    Sep. 8, 2011

(30) Foreign Application Priority Data

Mar. 8, 2010    (KR) .................. 10-2010-0020369

(51) Int. Cl.
*B32B 37/14*    (2006.01)
(52) U.S. Cl.
USPC ............ 428/203; 428/201; 349/122; 349/153
(58) Field of Classification Search
USPC ........................ 428/203, 201; 349/122, 153
See application file for complete search history.

(56) References Cited

U.S. PATENT DOCUMENTS

| | | | |
|---|---|---|---|
| 7,468,775 B2 * | 12/2008 | Lee et al. ..................... | 349/153 |
| 2001/0022639 A1 * | 9/2001 | Kwak et al. .................. | 349/122 |
| 2001/0050748 A1 * | 12/2001 | Lee ............................... | 349/153 |
| 2002/0044238 A1 * | 4/2002 | Lee ............................... | 349/110 |
| 2003/0035081 A1 * | 2/2003 | Jung et al. .................... | 349/152 |
| 2004/0165127 A1 * | 8/2004 | Lin et al. ...................... | 349/110 |

* cited by examiner

*Primary Examiner* — Mark Ruthkosky
*Assistant Examiner* — Christopher Polley

(57) ABSTRACT

A display panel includes a first substrate that has a first display area in which signal lines are formed, a second substrate that has a second display area corresponding to the first display area of the first substrate, and a sealant that is used to bond the first substrate and the second substrate and at least a portion of which is formed in either of the first display area of the first substrate and the second display area of the second substrate.

5 Claims, 4 Drawing Sheets

DISPLAY PANEL

This application claims the benefit of Korean Patent Application No. 10-2010-0020369 filed on Mar. 8, 2010, the entire contents of which is incorporated herein by reference for all purposes as if fully set forth herein.

BACKGROUND OF THE INVENTION

1. Field of the Invention

The present invention relates to a display panel and a manufacturing method thereof, and more particularly to a display panel which is manufactured to have a size and a shape different from a standard specification through reprocess of a standard display panel in which a first substrate and a second substrate are bonded together, and a manufacturing method thereof.

2. Discussion of the Related Art

Most of information communication systems have operated based on digital signal process technology. On the contrary, because information humans hear and see is analog information, a digital signal has to be converted into an analog signal.

In recent years, various kinds of flat display devices capable of reducing weight and volume which are disadvantages of a cathode ray tube have been developed. Such flat display devices include liquid crystal displays ("LCDs"), field emission displays ("FEDs"), plasma display panels ("PDPs"), electroluminescence devices ("ELDs"), electrophoresis displays ("EPDs"), flexible displays, and the like. The ELDs include inorganic ELDs and organic ELDs. An example of the organic ELDs includes an organic light emitting diode (OLED).

Existing display module manufacturers manufacture display panels according to specifications satisfying standard resolutions (standard specification) shown in following Table 1.

TABLE 1

| Resolution | X | Y | X:Y | |
|---|---|---|---|---|
| VGA | 640 | 480 | 4 | 3 |
| SVGA | 800 | 600 | 4 | 3 |
| XGA | 1024 | 768 | 4 | 3 |
| XGA+ | 1152 | 864 | 4 | 3 |
| WXGA | 1280 | 800 | 16 | 10 |
| SXGA | 1280 | 1024 | 5 | 4 |
| WXGA+ | 1440 | 900 | 16 | 10 |
| UXGA | 1600 | 1200 | 4 | 3 |
| WSXGA+ | 1680 | 1050 | 16 | 10 |
| WUXGA | 1920 | 1200 | 16 | 10 |
| QXGA | 2048 | 1536 | 4 | 3 |
| WQXGA | 2560 | 1600 | 16 | 10 |
| QSXGA | 2560 | 2048 | 5 | 4 |
| WQSXGA | 3200 | 2048 | 25 | 16 |
| QUXGA | 3200 | 2400 | 4 | 3 |
| WQUXGA | 3800 | 2400 | 16 | 10 |

Recently, with the expansion of use of the displays, there are increasing demands for displays having nonstandard sizes different from the standard specifications or unusual shapes. For example, digital information displays ("DIDs") used as digital billboards for various kinds of information and promotions in places such as theaters, wedding halls, hotel lobbies, public offices, or tourist spots, and display devices used as navigation devices in automobiles, ships, and airplanes, have attracted attentions as new product group in the display industry.

However, the display devices such as the LCDs, the FEDs, the ELDs, the EPDs, the PDPs, and the flexible displays, which are currently used, are manufactured according to the standard specifications, and thus it is difficult for them to be used as the DIDs or the navigation display devices which require diversified sizes.

The existing display module manufacturers do not manufacture nonstandard display panels since even if there is a demand for nonstandard display panels, the market thereof is much smaller than the standard display market. In other words, if display panels of various sizes are to be manufactured, a photo mask is required to be designed, patterned, and formed according to each size, and this causes manufacturing costs to be increased. Therefore, it is not efficient to manufacture the nonstandard display panels using separate photo masks. Thereby, there is a need for methods for satisfying the demands for the nonstandard display panels, or display panels having sizes or shapes which are not manufactured by the existing display module manufacturers. For this, there has been a study on a method for manufacturing nonstandard display panels or display panels having unusual shapes through reprocess of standard display panels which have been manufactured by the existing display module manufacturers. In this method, a portion of a standard display panel which has been manufactured is cut to have a desired size or shape, and the cut surface is sealed. However, it is not easy to seal the cut surface, and even after the cut surface is sealed, the sealing is not strong, and thus a sealing defect occurs.

For example, a liquid crystal display panel manufactured by the existing LCD module manufacturer, which is used in an active matrix thin film transistor LCD (AM TFT LCD), includes an upper glass substrate 11, a lower glass substrate 12, and a liquid crystal layer 14 which is sealed by a sealant 13 is interposed therebetween. A color filter array is formed on the upper glass substrate 11, a TFT array is formed on the lower glass substrate 12, and spacers for maintaining a cell gap of the liquid crystal layer 14 are disposed therebetween. The cell gap of the liquid crystal layer 14 is maintained to be as high as the spacers due to the internal vacuum of the liquid crystal display panel before being cut. When the liquid crystal display panel is cut, the vacuum pressure inside the liquid crystal display panel varies, and thus the liquid crystal molecules are partially collected or reduced due to air introduced into the liquid crystal layer or due to bending or twisting caused by the self-weight of the liquid crystal display panel. Therefore, there is a need to solve the problems generated after being cut.

SUMMARY OF THE INVENTION

It is desirable to provide a display panel which does not generate problems after being cut and has a desired size and shape without separately manufacturing high-cost photo masks, and a method of manufacturing the same.

According to an embodiment of the present invention, there is provided a display panel including a first substrate that has a first display area in which signal lines are formed; a second substrate that has a second display area corresponding to the first display area of the first substrate; and a sealant that is used to bond the first substrate and the second substrate and at least a portion of which is formed in either of the first display area of the first substrate and the second display area of the second substrate.

According to an embodiment of the present invention, there is provided a manufacturing method of a display panel including the steps of preparing a first substrate that has a first display area in which signal lines are formed; preparing a second substrate that has a second display area corresponding to the first display area of the first substrate; applying a sealant on at least one of the first display area of the first substrate and the second display area of the second substrate; aligning the first substrate and the second substrate such that the first display area faces the second display area and bonding the first substrate and the second substrate; and cutting the bonded first and second substrates such that the sealant is positioned inside.

In the above-described configuration, the display panel may be one of a display panel of a liquid crystal display (LCD), a display panel of a field emission display (FED), a display panel of a plasma display panel (PDP), a display panel of an electroluminescence device (ELD), a display panel of an electrophoresis display (EPD), and a display panel of a flexible display.

In addition, the sealant may be formed in a closed loop type or in an open loop type a portion of which is open.

Also, the first substrate may include a non-display area positioned outside the first display area; and pads formed in the non-display area and connected to the signal lines.

According to the present invention, since a display panel having a size or a shape which a consumer desires can be manufactured through reprocess of a standard display panel without separately an expensive photo mask, it is possible to achieve an effect capable of being applied to nonstandard display devices at a low cost and to obtain a more reliable and stronger display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
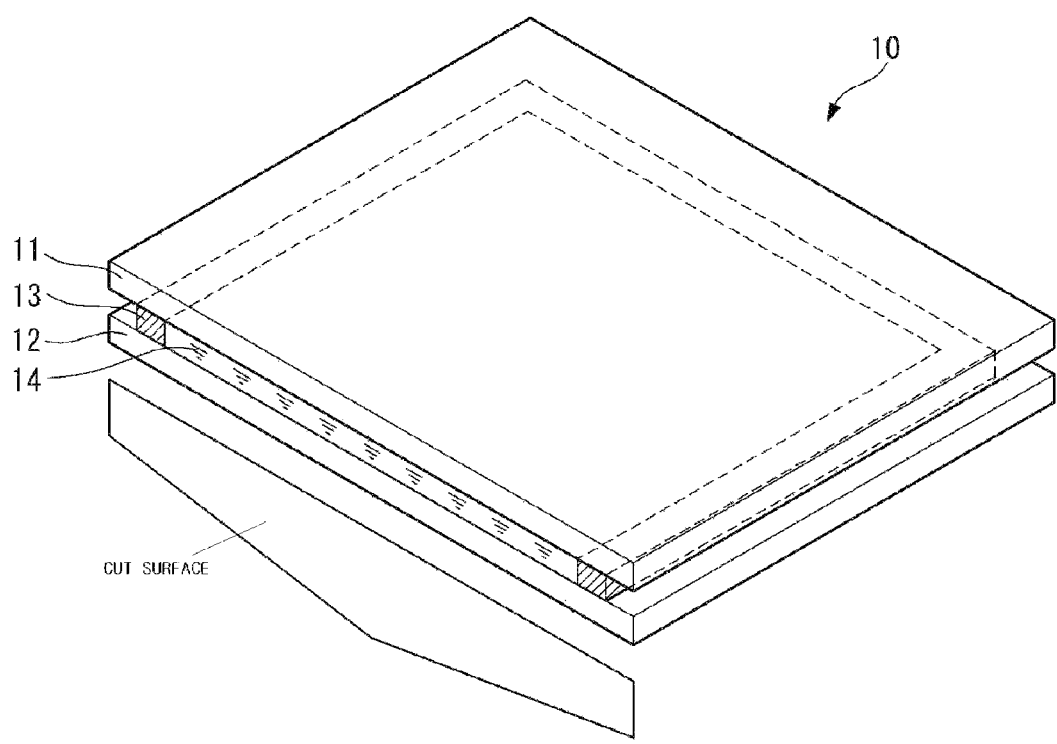
FIG. 1 is a perspective view illustrating a partially cut liquid crystal display panel.
Figure 2:
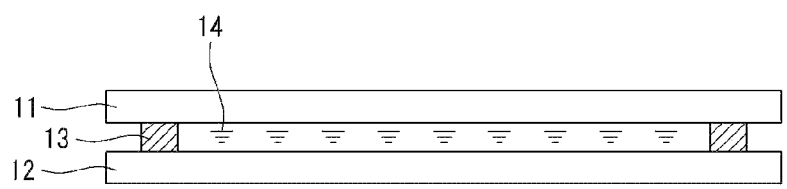
FIG. 2 is a cross-sectional view of the liquid crystal display panel shown in FIG. 1.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

The display panel according to an embodiment of the present invention is applicable to, for example, a display panel of the LCD, a display panel of the FED, a display of the PDP, a display panel of the ELD, a display panel of the EPD, a display panel of the flexible display, and the like.

Although a liquid crystal display panel is described below as an example, a display panel according to an embodiment of the present invention is not limited to the liquid crystal display panel, but is also applicable to the above-described display panels.

Hereinafter, embodiments of this document will be described in detail with reference to the accompanying drawings. Like reference numerals designate like elements throughout the specification. In the following description, when a detailed description of well-known functions or configurations related to the present invention is determined to unnecessarily cloud a gist of the present invention, the detailed description thereof will be omitted.

Figure 3:
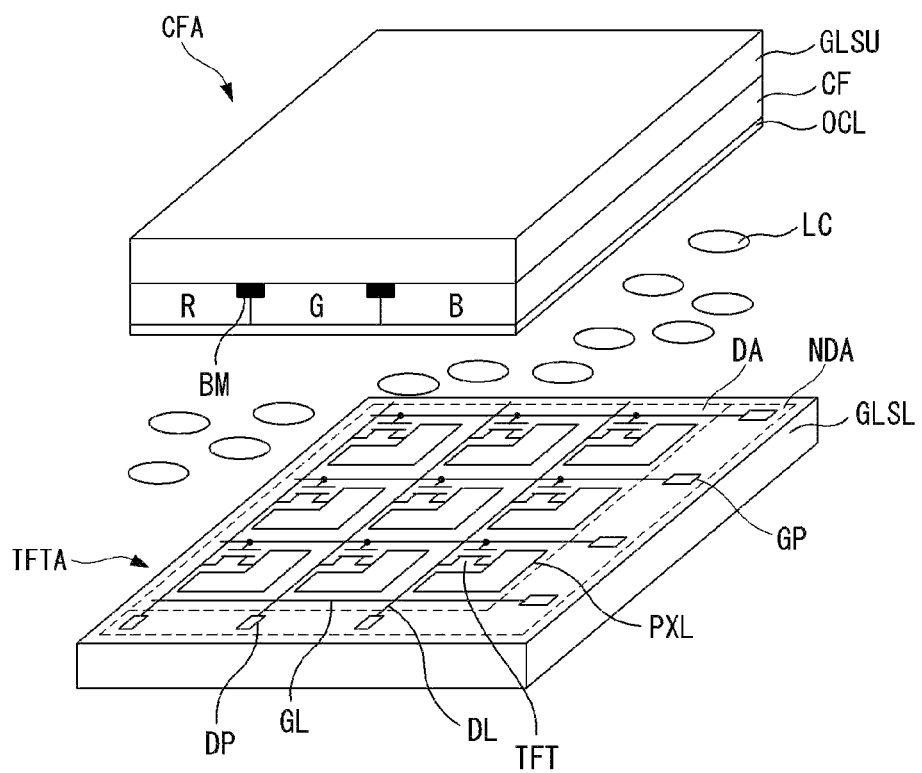
FIG. 3 is an exploded perspective view illustrating a portion of a liquid crystal display panel according to an embodiment of the present invention.

FIG. 3 is an exploded perspective view illustrating a portion of a liquid crystal display panel according to an embodiment of the present invention.

In FIG. 3, the liquid crystal display panel includes a TFT array substrate TFTA, a color filter array substrate CFA, and a liquid crystal layer LCC interposed between the substrates.

The TFT array substrate TFTA is provided with a first glass substrate GLSL having a display area DA and a non-display area NDA. In the display area DA of the first glass substrate GLSL, signal lines, TFTs, pixel electrodes PXL, and storage capacitors (not shown) connected to the pixel electrodes PXL are formed. The signal lines include a plurality of data lines DL and a plurality of gate lines GL disposed to intersect the data lines DL. In addition, in the non-display area NDA of the first glass substrate, gate pads GP connected to the gate lines GL and data pads DP connected to the data lines DL are formed. Liquid crystal cells are formed in a matrix at the intersections of the data lines DL and the gate lines GL, connected to the TFTs, and are driven by an electric field generated between the pixel electrodes PXL and a common electrode (not shown).

The color filter array substrate CFA is provided with a second glass substrate GLSU having a display area corresponding to the display area DA of the TFT array substrate. Black matrices BM, color filters CF(R), CF(G) and CF(B), and an overcoat layer OCL are formed on the second glass substrate GLSU. The overcoat layer OCL is a transparent resin layer which covers the black matrices BM and the color filters CF(R), CF(G) and CF(B) and planarizes an inner surface of the color filter array substrate CFA which comes into contact with the liquid crystal layer LC.

Alignment layers for setting pre-tilt angle of the liquid crystal molecules are respectively formed on the inner surface of the TFT array substrate TFTA and the color filter array substrate CFA which come into contact with the liquid crystal layer LC. The common electrode is disposed on the color filter array substrate CFA in a vertical electric field driving type such as a TN (twisted nematic) mode and a VA (vertical alignment) mode, and is disposed on the TFT array substrate TFTA along with the pixel electrodes in a horizontal electric field type such as an IPS (in plane switching) mode and an FFS (fringe field switching) mode. Polarizers (not shown) are respectively attached to the outer surface of the TFT array substrate and the color filter array substrate.

The liquid crystal display panel according to the embodiment of the present invention includes a sealant S for bonding the TFT array substrate TFTA and the color filter array substrate CFA, and at least a portion of the sealant S is formed in the display areas of the TFT array substrate TFTA and the color filter array substrate CFA.

Figure 4:
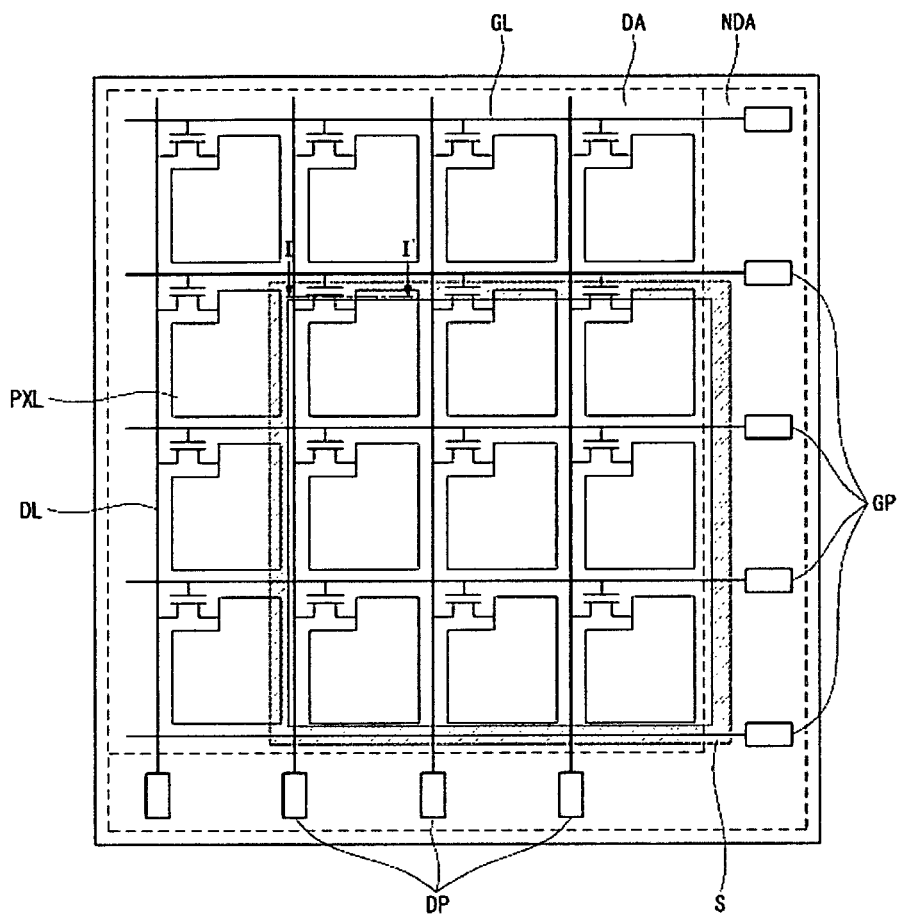
FIG. 4 is a plan view illustrating a TFT array substrate on which a sealant is applied.
Figure 5:
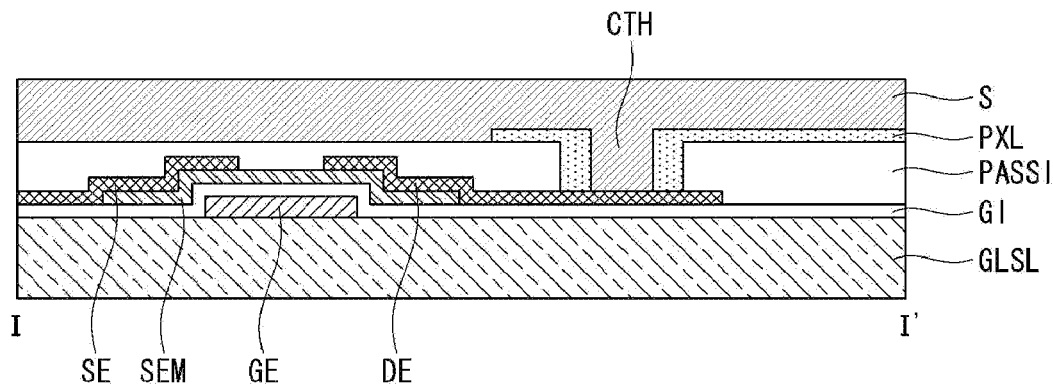
FIG. 5 is a cross-sectional view taken along the line I-I' in FIG. 4.

FIG. 4 is a plan view illustrating the TFT array substrate TFTA on which the sealant S is applied, and FIG. 5 is a cross-sectional view taken along the line I-I' in FIG. 4.

Referring to FIGS. 4 and 5, at least a portion of the sealant S is positioned in the display area DA of the TFT array substrate TFTA. On the first glass substrate GLSL, gate metal patterns including gate electrodes GE, made of gate metal, of the TFTs, gate lines GL connected to the gate electrodes GE, and the gate pads GP connected to the ends of the gate lines GL. The gate pads GP are connected to output pins of a gate drive IC.

The gate metal may include aluminum or aluminum alloy. A gate insulating layer GI is made of an inorganic insulating material such as silicon oxide SiOx or silicon nitride SiNx, and is formed on the first glass substrate GLSL to cover the gate metal patterns.

A semiconductor pattern SEM is formed on the gate insulating layer GI. The semiconductor pattern SEM is formed at the TFT so as to overlap with the gate electrode GE. Source/drain metal patterns overlap with the semiconductor pattern. The source/drain metal patterns include source electrodes SE and drain electrodes DE of the TFTs, data lines DL connected to the source electrodes, and data pads DP connected to the ends of the data lines DL.

The data pads DP are connected to output pins of a source drive IC. The source/drain metal includes any one of metal such as molybdenum (Mo), chrome (Cr) or copper (Cu) and an alloy thereof.

A passivation layer PASSI includes contact holes which expose a portion of the drain electrode of the TFT, a portion of the data pad DP, and a portion of the gate pad GP, and is formed on the first glass substrate GLSL so as to cover the TFTs and the signal lines. The contact hole exposing the gate pad GP exposes the gate pad GP penetrating the passivation layer PASSI and the gate insulating layer GI. A material forming the passivation layer includes an inorganic insulating material such as the gate insulating layer material or an organic insulating material such as acryl. The pixel electrode PXL is connected to the drain electrode DE of the TFT via the contact hole CTH penetrating the passivation layer PASSI. A data pad upper electrode (not shown) is connected to the data pad DP via a contact hole (not shown) penetrating the passivation layer PASSI. A gate pad upper electrode (not shown) is connected to the gate pad DP via a contact hole (not shown) penetrating the passivation layer PASSI. The pixel electrode PXL, the data pad upper electrode, and the gate pad upper electrode are made of a transparent conductive material such as indium tin oxide (ITO), tin oxide (TO), indium zinc oxide (IZO), or indium tin zinc oxide (ITZO).

The sealant S for bonding the TFT array substrate and the color filter array substrate is applied on the passivation layer PASSI. The sealant S may be formed to overlap with at least one of the gate lines GL and the data lines DL, which are signal lines formed in the display area DA of the TFT array substrate. Alternatively, the sealant S may be formed to overlap with at least a portion of the gate electrodes GE, the source electrodes SE, the drain electrodes DE, and the pixel electrodes PXL.

In addition, the sealant S is formed in a closed loop type in the example shown in FIG. 4, but may be formed in an open loop type a portion of which is open. The loop formed by the sealant S may be formed in various shapes such as a rectangular shape, a circular shape, and a polygonal shape, as necessary.

Although the case where the above-described sealant S according to the embodiment of the present invention is formed on the TFT array substrate TFTA has been described, the present invention is not limited thereto, but the sealant may be formed on the color filter array substrate CFA. In this case, at least a portion of the sealant S is preferably formed in the display area of the color filter array substrate corresponding to the display area DA of the TFT array substrate TFTA.

Figure 6:
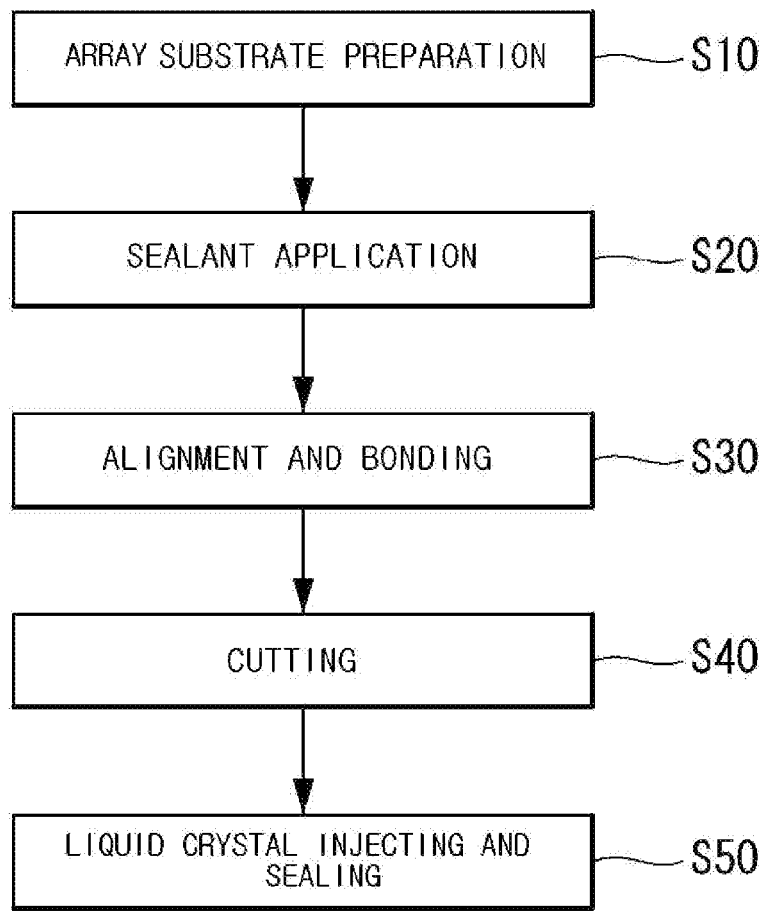
FIG. 6 is a flowchart illustrating a manufacturing order of the liquid crystal display panel according to an embodiment of the present invention.

FIG. 6 is a flowchart illustrating a manufacturing order of the liquid crystal display panel according to the embodiment of the present invention.

In FIG. 6, a manufacturing method of the liquid crystal display panel according to the embodiment of the present invention includes a substrate preparing step (S10) of preparing standard TFT array substrate and color filter array substrate, a sealant applying step (S20) of applying a sealant on either of the TFT array substrate and the color filter array substrate, an aligning and bonding step (S30) of aligning the TFT array substrate and the color filter array substrate and bonding them, a cutting step (S40) of cutting the bonded TFT array substrate and color filter array substrate such that the sealant is positioned inside, and a liquid crystal injecting and sealing step (S50) of injecting liquid crystal between both the array substrates and sealing the liquid crystal.

First, in the substrate preparing step (S10), the first glass substrate GLSL having the display area DA and the non-display area NDA and the second glass substrate GLSU having the display area corresponding to the display area DA of the TFT array substrate are prepared. Further, as shown in FIG. 3, the standard TFT array substrate is prepared in which the signal lines including the gate lines and the data lines, the TFTs, the pixel electrodes PXL, the storage capacitors (not shown) connected to the pixel electrodes PXL are formed in the display area of the first glass substrate GLSL, and the gate pads GP connected to the gate lines GL and the data pads DP connected to the data lines DL are formed in the non-display area NDA. The standard TFT array substrate TFTA preferably has a dimensional range larger than and closest to a size of a display panel which is desired to be manufactured. Next, the standard color filter array substrate CFA is prepared in which the black matrices BM, the color filters CF(R), CF(G) and CF(B), and overcoat layers OCL are formed on the second glass substrate GLSU having the display area corresponding to the display area DA of the TFT array substrate TFTA. The standard color filter array substrate CFA also preferably has a dimensional range larger than and closest to a size of a display panel which is desired to be manufactured.

In the sealant applying step (S20), as shown in FIG. 4, the sealant S is applied on at least a portion of the display area DA of the TFT array substrate TFTA or at least a portion of the display area (not shown) of the color filter array substrate CFA corresponding to the display area DA of the TFT array substrate TFTA, so as to have a smaller size than the standard liquid crystal display panel. At least a portion of the sealant applied in the display area DA of the TFT array substrate TFTA may overlap with at least one of the gate lines GL and the data lines DL, or may overlap with at least a portion of the gate electrodes GE, the source electrodes DE, the drain electrodes DE, and the pixel electrodes PXL. In addition, the sealant S is formed in a closed loop type in the example shown in FIG. 4, but may be formed in an open loop type a portion of which is open. The loop formed by the sealant S may be formed in various shapes such as a rectangular shape, a circular shape, and a polygonal shape, as necessary.

In the aligning and bonding step (S30), the TFT array substrate TFTA on which the sealant S is applied and the color filter array substrate CFA are aligned with each other such that the display area DA of the TFT array substrate TFTA corresponds with the display area of the color filter array substrate CFA, and then are bonded together.

In the cutting step (S40), the bonded TFT array substrate TFTA and color filter array substrate CFA are cut such that the sealant S shown in FIG. 4 is positioned inside.

In the liquid crystal injecting and sealing step (S50), liquid crystal is injected between the cut TFT array substrate TFTA and color filter array substrate CFA and is sealed so as not to flow outwards.

It should be understood by those skilled in the art that various modifications, combinations, sub-combinations and alterations may occur depending on design requirements and other factors insofar as they are within the scope of the appended claims or the equivalents thereof.

What is claimed is:

1. A display panel comprising:
   a first substrate that has a first display area and a first non-display area;
   a second substrate that has a second display area corresponding to the first display area of the first substrate and a second non-display area corresponding to the first non-display area thereof; and
   a sealant that is used to bond the first substrate and the second substrate,
   wherein the first display area of the first substrate includes:
   a plurality of data lines;
   a plurality of gate lines intersecting the data lines; and
   pixel electrodes formed at the intersections of the plurality of data lines and the plurality of gate lines,
   wherein the sealant forms a boundary between the first display area and the first non-display area of the first substrate, and
   wherein a portion of the sealant is formed so as to intersect the gate lines and the data lines in the first display area and is also formed so as to overlap some of the pixel electrodes.

2. The display panel according to claim 1, wherein the display panel is selected from the group consisting of a display panel of a liquid crystal display (LCD), a display panel of a field emission display (FED), a display panel of a plasma display panel (PDP), a display panel of an electroluminescence device (ELD), a display panel of an electrophoresis display (EPD), and a display panel of a flexible display.

3. The display panel according to claim 1, wherein the sealant is formed in a closed loop type or in an open loop type wherein a portion of the loop is open.

4. The display panel according to claim 1, wherein the first display area of the first substrate further includes thin film transistors connected to the pixel electrodes, respectively, and
   wherein the sealant overlaps with at least one of the thin film transistors which are formed in the first display area of the first substrate.

5. The display panel according to claim 1, wherein the second display area of the second substrate includes
   a plurality of color filters; and
   black matrices disposed between the plurality of color filters,
   wherein the sealant forms a boundary between the second display area and the second non-display area of the second substrate, and a portion of the sealant is formed so as to overlap at least some of the color filters in the second display area.

* * * * *